(12) United States Patent
Himayat et al.

(10) Patent No.: US 8,630,229 B2
(45) Date of Patent: Jan. 14, 2014

(54) BASE STATION AND METHOD FOR REDUCING ASYNCHRONOUS INTERFERENCE IN A MULTI-TIER OFDMA OVERLAY NETWORK

(75) Inventors: Nageen Himayat, Fremont, CA (US); Shilpa Talwar, Santa Clara, CA (US); Honggang Li, Beijing (CN); Jaroslaw J. Sydir, San Jose, CA (US); Kerstin Johnson, Palo Alto, CA (US); Shu-Ping Yeh, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 262 days.

(21) Appl. No.: 12/822,925

(22) Filed: Jun. 24, 2010

(65) Prior Publication Data

US 2011/0002270 A1  Jan. 6, 2011

Related U.S. Application Data

(60) Provisional application No. 61/223,360, filed on Jul. 6, 2009.

(51) Int. Cl.
*H04W 88/06*  (2009.01)

(52) U.S. Cl.
USPC .......................................... 370/328

(58) Field of Classification Search
USPC .......................................... 370/328
See application file for complete search history.

(56) References Cited

U.S. PATENT DOCUMENTS 7,821,994 B2 * 10/2010 Sherman et al. ............. 370/329
8,149,733 B2 * 4/2012 Basu et al. .................... 370/254
2008/0107200 A1 5/2008 Zhu et al.
2008/0232344 A1 * 9/2008 Basu et al. .................... 370/350
2009/0022098 A1 1/2009 Novak et al.
2009/0245409 A1 * 10/2009 Kandukuri Narayan et al. .............................. 375/267
2009/0247084 A1 * 10/2009 Palanki ........................ 455/63.1
2010/0046492 A1 * 2/2010 Abraham et al. ............. 370/342
2010/0220610 A1 * 9/2010 Li et al. ....................... 370/252

FOREIGN PATENT DOCUMENTS

| JP | 200910509 A | 1/2009 |
| WO | WO-2009048094 A1 | 4/2009 |
| WO | WO-2011005727 A2 | 1/2011 |
| WO | WO-2011005727 A3 | 1/2011 |

OTHER PUBLICATIONS

IEEE STD P802.16-Rev2/D9 (Jan. 2009), 2082 pages.
IEEE, P802.16m/D3 (Dec. 2009), 925 pages.
"International Application Serial No. PCT/US2010/041017, Search Report and Written Opinion mailed Feb. 8, 2011", 9 pages.

(Continued)

*Primary Examiner* — Ricky Ngo
*Assistant Examiner* — Ben H Liu
(74) *Attorney, Agent, or Firm* — Schwegman, Lundberg & Woessner, P.A.

(57) ABSTRACT

Embodiments of a base station and method for reducing asynchronous interference in a multi-tier OFDMA overlay network are generally described herein. In some embodiments, a lower-tier base station is configured to adjust OFDMA frame boundaries to cause frames communicated by a higher-tier to arrive within a cyclic prefix at the lower-tier base station. The lower-tier base station may also be configured to adjust OFDMA frame boundaries to cause frames communicated by a lower-tier of the network to arrive within a cyclic prefix at a higher-tier mobile station. Accordingly, frames from one tier may arrive within the cyclic prefix of another thereby reducing asynchronous interference.

21 Claims, 6 Drawing Sheets

(56) References Cited

OTHER PUBLICATIONS

Himayat, N, et al., "Synchronizing uplink transmissions from femto AMSs", IEEE C802.16m-1348, Jul. 2009., 8 pages.

Shu, Feng, et al., "Analysis of time and frequency synchronization error for wireless systems using OFDM", Sciences in China, Ser. F, Information Sciences, 48(3), (2005), 379-396.

"Japanese Application Serial No. 2012-519656, Office Action mailed Jul. 2, 2013", 4 pgs.

"Japanese Application Serial No. 2012-519656, Response filed Aug. 27, 2013 to Office Action mailed Jul. 2, 2013", 21 pgs.

"Korean Application Serial No. 10-2012-7003151, Response filed Aug. 26, 2013 to Office Action mailed Jul. 16, 2013", 15 pgs.

* cited by examiner

MULTI-TIER OFDMA OVERLAY NETWORK

| | |
|---|---|
| FFT SIZE | 1024 |
| TSYMB | 89.2 us |
| DISTANCE FOR 1 SAMPLE | 26 METERS |
| 100 METERS (FEMTO FOOTPRINT) | 4 SAMPLES |
| SYNC. ACCURACY (16e, 8.4.10.1.2) | 1/128 SYMB (8 SAMPLES) |
| DELAY SPREAD (DS) | 24 (2us) SAMPLES |
| CP-1/8 (CYCLIC PREFIX) | 128 SAMPLES |
| CP-1/16 | 64 SAMPLES |

BASE STATION AND METHOD FOR REDUCING ASYNCHRONOUS INTERFERENCE IN A MULTI-TIER OFDMA OVERLAY NETWORK

PRIORITY CLAIM

This application claims the benefit of priority under 35 USC 119(e) to U.S. Provisional Patent Application Ser. No. 61/223,360, filed Jul. 6, 2009, which is incorporated herein by reference in its entirety.

TECHNICAL FIELD

Embodiments pertain to wireless communication networks. Some embodiments relate to multi-tier network synchronization and networks that implement an orthogonal frequency division multiple access (OFDMA) communication technique. Some embodiments relate to reducing interference in a multi-tier OFDMA overlay network, including WiMAX networks configured in accordance with IEEE 802.16(m) and networks configured in accordance with 3GPP-LTE advanced.

BACKGROUND

A multi-tier overlay network may include a higher tier of higher-tier base stations and higher-tier mobile stations as well as a lower tier of lower-tier base stations and lower-tier mobile stations. The lower-tier base stations and mobile stations operate within the footprint of a higher-tier base station. One issue with same-frequency multi-tier overlay networks is interference caused by conflicting communications within the same frequency spectrum. Communications within the one tier may interfere with communications within another tier. Multi-tier OFDMA overlay networks use cyclic prefixes as a guard interval to, among other things, reduce interference between symbols, however, frames from one tier that arrive outside the cyclic prefix at another tier may cause asynchronous interference. Frames from one tier that arrive within the cyclic prefix at another tier may cause synchronous interference. Asynchronous interference is significantly more difficult to manage than synchronous interference.

Thus there are general needs for reducing asynchronous interference in a multi-tier OFDMA overlay network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
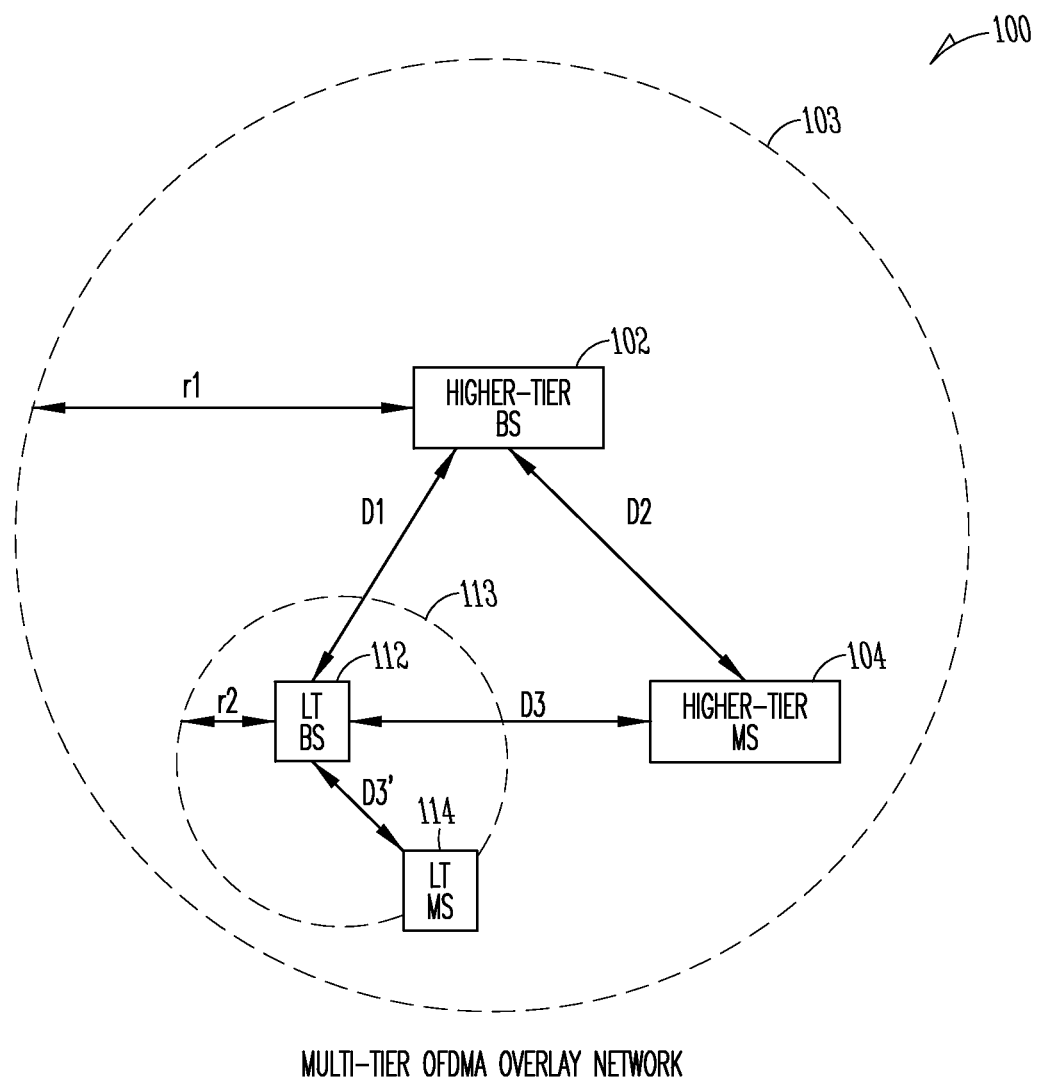
FIG. 1 illustrates a multi-tier OFDMA overlay network in accordance with some embodiments.

FIG. 1 illustrates a multi-tier OFDMA overlay network in accordance with some embodiments. Multi-tier OFDMA overlay network 100 may comprise two or more tiers including higher tiers and lower tiers. Each tier may include base stations and mobile stations that communicate within their tier. In multi-tier OFDMA overlay network 100, a higher tier includes a higher-tier base station (BS) 102 and one or more higher-tier mobile stations, such as higher-tier mobile station (MS) 104, associated with the higher-tier base station 102. The lower tier includes a lower-tier base station (LT BS) 112 and one or more lower-tier mobile station, such as lower-tier mobile station (LT MS) 114, associated with the lower-tier base station 112. Although the multi-tier OFDMA overlay network 100 is illustrated has having only two tiers, the multi-tier OFDMA overlay network 100 may include several tiers.

The lower-tier base station 112 may communicate with the lower-tier mobile station 114 within a lower-tier service area 113. The higher-tier base station 102 may communicate with the higher-tier mobile station 104 within a higher-tier service area 103. The lower-tier service area 113 may be located at least partially within the higher-tier service area 103. The lower-tier base station 112 and the higher-tier base station 102 may communicate with their associated mobile stations using a same frequency spectrum. In accordance with some embodiments, the lower-tier base station 112 may communicate with the lower-tier mobile station 114 in accordance with an OFDMA communication technique and the higher-tier base station 102 may communicate with the higher-tier mobile station 104 in accordance with the OFDMA communication technique.

The lower-tier base station 112 and the higher-tier base station 102 may communicate with their associated mobile stations using a same frequency spectrum. The use of the same frequency spectrum for communicating OFDMA frames may result in asynchronous interference when OFDMA frames intended for other device arrive outside the cyclic prefix of an OFDMA frame. The use of the same frequency spectrum for communicating OFDMA frames may result in synchronous interference when OFDMA frames intended for other device arrive within the cyclic prefix of a frame.

In some embodiments, the lower-tier base station 112 and the higher-tier base station 102 may communicate OFDMA frames with their associated mobile stations using the same set of non-orthogonal OFDM subcarriers. In these embodiments, the lower-tier base station 112 and the higher-tier base station 102 may communicate using at least some non-orthogonal subcarriers.

In accordance with embodiments, the lower-tier base station 112 is configured to reduce asynchronous interference within the multi-tier OFDMA overlay network 100 by adjusting its frame boundaries. This may allow interference to be received synchronously. In these embodiments, the lower-tier base station 112 may adjust its OFDMA frame boundaries to cause frames communicated by the higher-tier to arrive within a cyclic prefix at the lower-tier base station 112. The lower-tier base station 112 may also adjust its OFDMA frame boundaries to cause frames communicated by the lower-tier to arrive within a cyclic prefix at a higher-tier mobile station 104. The lower-tier mobile station 114 may also adjust its transmission times as described in more detail below.

In some embodiments, the lower-tier base station 112 may advance its uplink OFDMA frame boundaries to align its uplink OFDMA frame boundaries with uplink frame transmissions of the higher tier. The lower-tier base station 112 may also delay its downlink OFDMA frame boundaries, if necessary, to align its downlink OFDMA frame boundaries with downlink frame transmissions of the higher tier. The adjustment of the uplink OFDMA frame boundaries may help ensure that the uplink transmissions of the higher-tier mobile station 104 are received within a cyclic prefix at the lower-tier base station 112 to reduce asynchronous interference at the lower-tier base station 112. The adjustment of the downlink OFDMA frame boundaries may help ensure that the downlink transmissions of the lower-tier base station 112 to a lower-tier mobile station 114 are received within a cyclic prefix at the higher-tier mobile station 104 to reduce asynchronous interference at the higher-tier mobile station 104.

As explained in more detail below, the adjustment of frame boundaries by the lower-tier base station 112 and the lower tier mobile station 114 may be particularly important when the higher-tier mobile station 104 resides within the service area 113 of the lower-tier base station 112.

Figure 2:
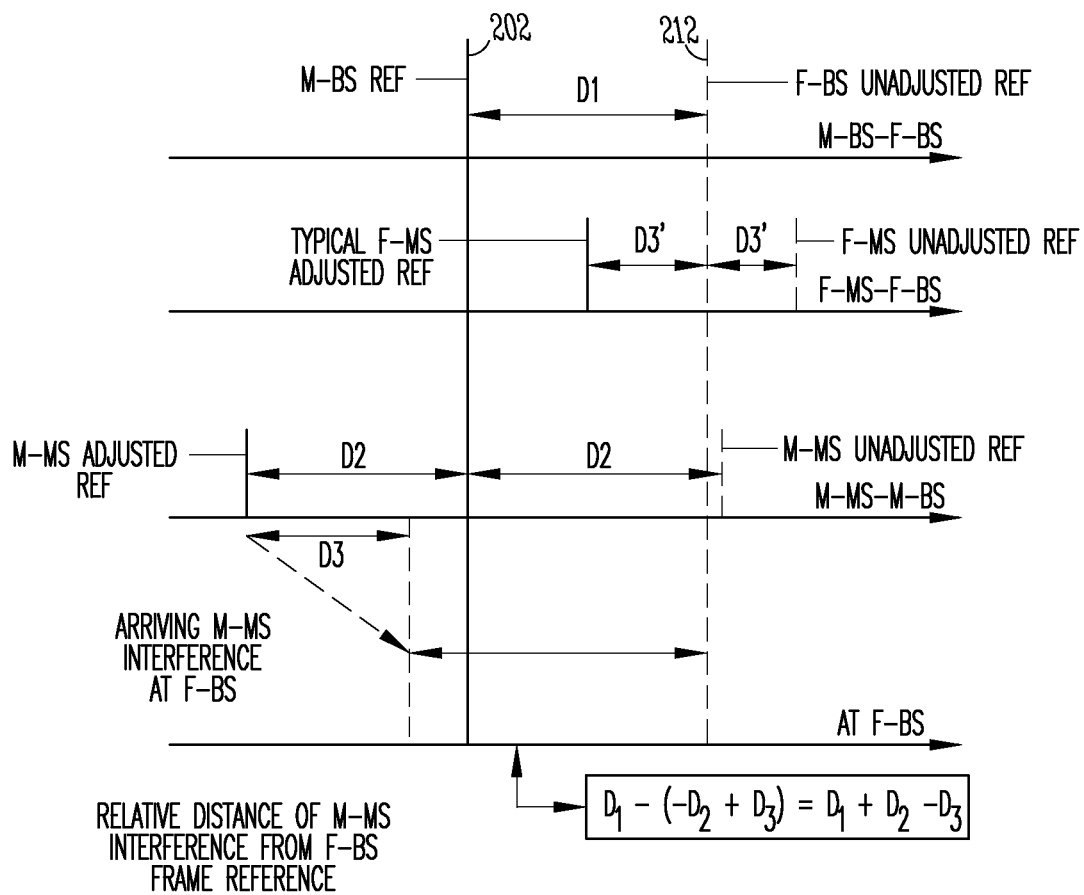
FIG. 2 illustrates unadjusted frame boundaries that may result in asynchronous interference.

FIG. 2 illustrates unadjusted frame boundaries that may result in asynchronous interference. In FIG. 2, a scenario is illustrated where a lower-tier mobile station (referred to as a femto mobile station (F-MS)) and its associated lower-tier base station (referred to as a femto base station (F-BS)) use a conventional timing offset adjustment for uplink transmissions. In this example, the F-BS and F-MS operate within the presence of a higher-tier base station, referred to as a macro base station (M-BS) and an associated higher-tier mobile station, referred to as a macro mobile station (M-MS). In this scenario, the M-BS and the F-BS may be separated by a distance D1, the M-BS and the M-MS may be separated by a distance D2, the F-BS and the M-MS may be separated by a distance D3, and the F-MS and F-BS may be separated by a distance D3'.

The unadjusted timing reference 212 of the F-BS may be delayed with respect to timing reference 202 of the M-BS due to the signal propagation time over distance D1. The unadjusted timing reference 212 of the M-BS may be based on synchronization of a downlink frame from the M-BS received at the F-BS. The effect of synchronization errors on the frame timing may be ignored to simplify the illustration. The M-MS advances its uplink transmissions to arrive aligned with uplink frame boundary of the M-BS. The M-MS advances its uplink frame relative to the M-BS frame by the propagation delay between M-MS and the M-BS (i.e., over distance D2). If the F-BS's uplink receive frame boundary is not adjusted for this propagation delay over distance D1, the M-MS's uplink transmissions may arrive well in advance of the F-BS's frame boundary, possibly outside of the cyclic prefix at the F-BS, depending on distances D1 and D2. This may be particularly an issue when the M-MS is operating within the footprint of the F-BS. Because this interference is asynchronous, it is more difficult to mitigate than interference that is synchronous.

Figures 3A, 3B:
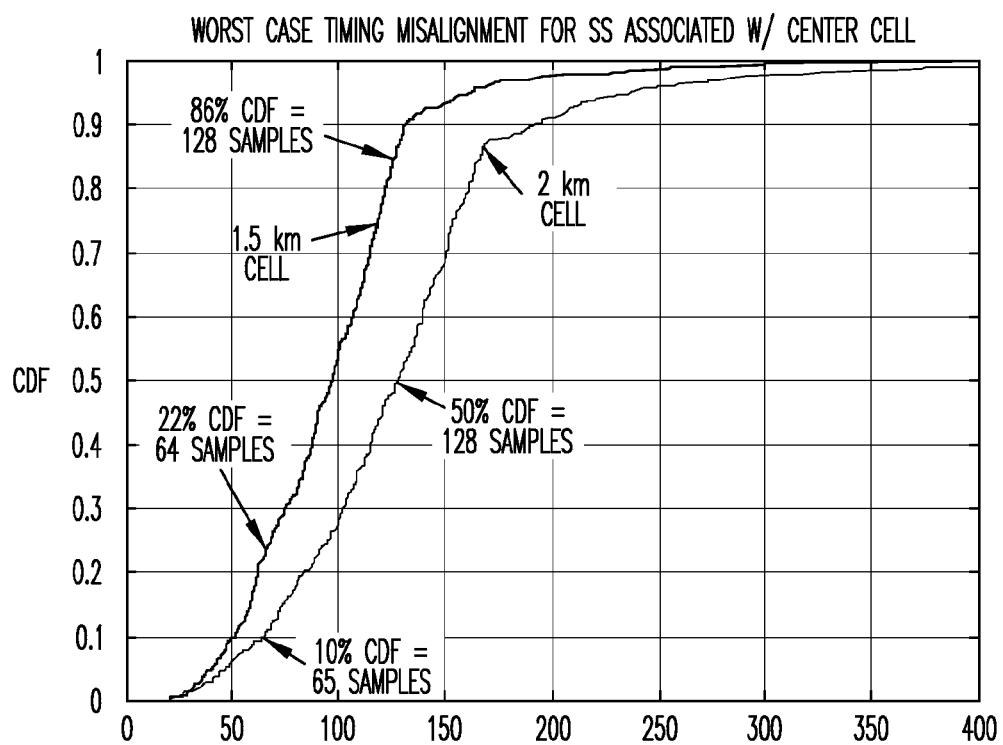
FIG. 3A is a table of various parameters of a multi-tier OFDMA overlay network.
FIG. 3B illustrates a cumulative distribution of timing misalignment errors that may result in asynchronous interference.

FIG. 3A is a table of various parameters of a multi-tier OFDMA overlay network. Using the parameters defined in the table of FIG. 3A, a worst case misalignment of M-MS interference may be estimated as a function of cell size and is shown in the table below.

| Cell Size (meters) | Worst Case (D1 + D2 − D3) ~2D1 ~2 × Cell Size (samples) | Worst Case Misalignment of Interference 2D1 + 2 δ (samples) |
|---|---|---|
| 500 | 39 | 55 |
| 1000 | 77 | 93 |
| 1500 | 115 | 131 |
| 2000 | 153 | 169 |

For these estimations, the femto footprint is assumed to be small (~100 meters), distance D1 may be approximately equal to distance D2, and distance D3 may negligible (e.g., 100 meters ~4 samples for 1024 FFT). Also shown is the overall timing misalignment adjusted for errors due to synchronization accuracy. Note that a synchronization error may be 2δ, given that both the F-BS and M-MS frame references can be in error by the synchronization accuracy. In this example, for a cyclic prefix of ⅛ symbol (CP-⅛), cell sizes of approximately 1.5 km may experience significant asynchronous interference outside of the cyclic prefix. The use of a shorter cyclic prefix (e.g., a CP of 1/16) may be precluded as even cell sizes below 1000 meters will be affected.

FIG. 3B illustrates a cumulative distribution of timing misalignment errors that may result in asynchronous interference. The distribution of timing errors in cell sizes of 1500 and 2000 meters in plotted in FIG. 3B. The timing errors are calculated based on the distance of a given a location from the center of the cell. It can be seen that for a cell size of 1.5 km, approximately 14% of locations in the cell may experience timing misalignment which exceeds a cyclic prefix of ⅛, which may equals 128 samples. However, for a 2 km cell size, the percentage of locations exceeding a cyclic prefix of ⅛ increases to 50%, which may be considered significant. A rough estimate of the increased noise floor introduced due to inter-symbol and inter-carrier interference generated by this example of timing misalignment indicates that for 50% of the misalignments exceeding the cyclic prefix, more than 70% will have a noise floor at −15 dB, for a 2 km cell size.

The interference from an M-MS may also be severe, even with low-density deployments of femto-cells because an F-MS will adjust its uplink transmission power to lower the interference caused by the macro-overlay network. If an F-MS's transmit power is reduced to avoid interference to macro-cell users, the signal-to-noise and interference ratio (SINR) at F-MSs may be degraded substantially. For example, for 0 dBm transmit power and a 10% cumulative distribution function (CDF), the SINR for M-MS may be about −20 dB while the SINR for F-BS may be about −13 dB. This interference may be significant. If this interference is asynchronous, then the increased noise floor resulting from inter-symbol and inter-carrier interference may preclude effective interference mitigation.

In accordance with embodiments, an F-BS may reduce asynchronous interference by adjusting its frame boundaries. This may allow interference to be received synchronously. To reduce asynchronous uplink interference resulting from timing mismatches between a F-MS and the M-MSs in a femto-cell overlay network which uses the M-BS as the timing reference, both the F-BS and the F-MS may adjust the start of their uplink frame (relative to the their downlink frame reference) by a round-trip delay (RTD) between the F-BS and M-BS (2×D1). Effectively this would advance the uplink frame relative to the M-BS receive frame reference by an additional amount of ½ RTD (D1). Since the femto footprint and D3 may be small (e.g., 100 meters), D1~D2 and interference from M-MS may be received within a cyclic prefix (CP) of the F-BS Uplink frame boundary. Based on numbers in the table of FIG. 3A, it can be seen that D3+delay spread (DS) will be less than the cyclic prefix. It is also seen that a transmission by the F-MS may still arrive within the CP of the F-BS's frame boundary. The interference from the F-MS at the M-BS would be similarly aligned. In IEEE 802.16(e) embodiments, the synchronization accuracy imposed by IEEE 802.16(e) may further assure that any additional resulting offset would typically be accommodated within the cyclic prefix.

Figure 4:
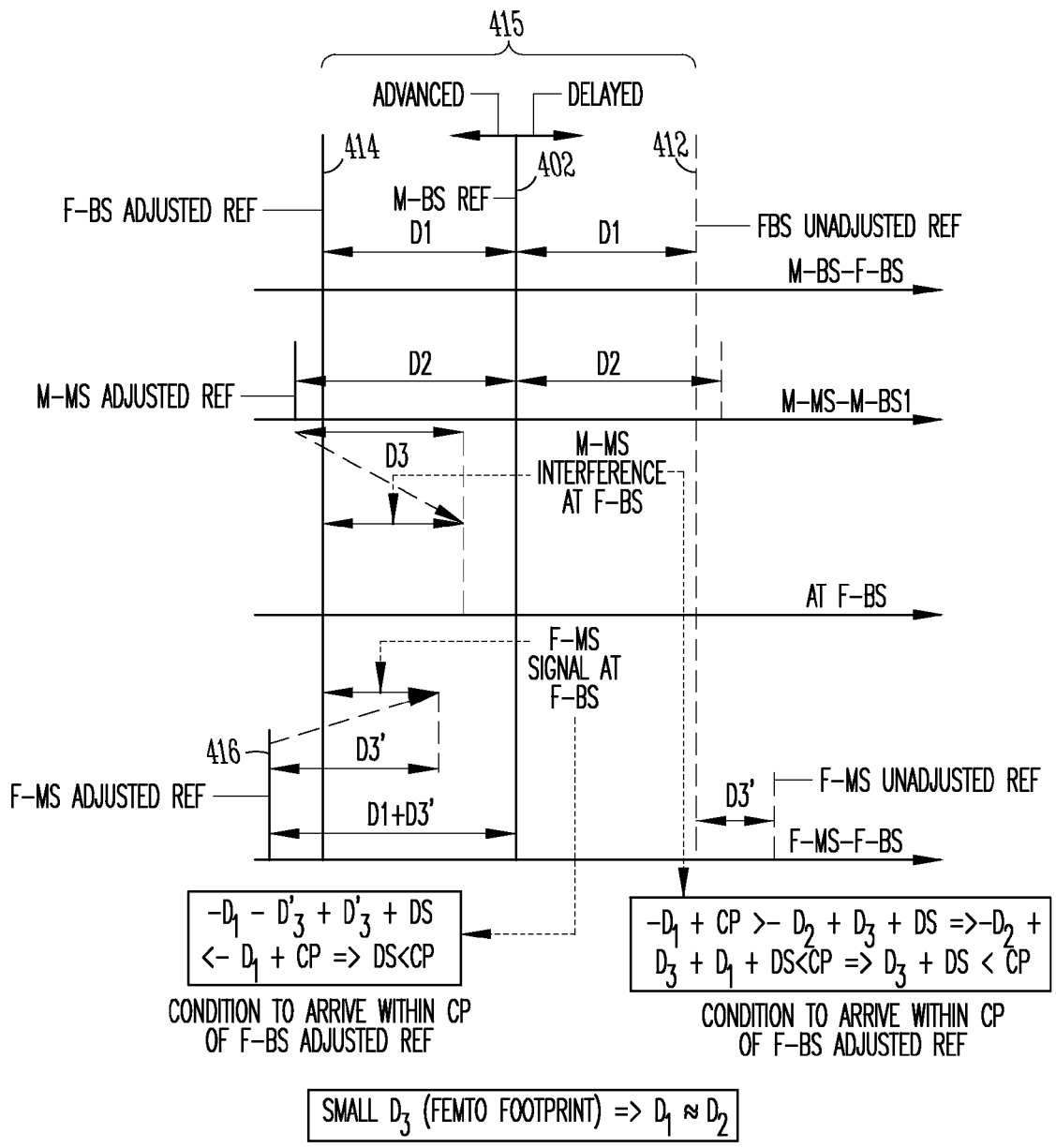
FIG. 4 illustrates the advancement of frame boundaries in accordance with some embodiments.

FIG. 4 illustrates the advancement of frame boundaries in accordance with some embodiments. FIG. 4 illustrates an initial unadjusted downlink frame boundary 412, a frame boundary 402 of the higher-tier base station 102 (FIG. 1), and an adjusted uplink OFDMA frame boundary 414 of the lower-tier base station 112 (FIG. 1).

Referring to FIG. 1 and FIG. 4 together, the lower-tier base station 112 may advance its uplink OFDMA frame boundaries 414 to align the its uplink OFDMA frame boundaries 414 with uplink frame transmissions of the higher tier. The lower-tier base station 112 may also delay its downlink OFDMA frame boundaries, if necessary, to align its downlink OFDMA frame boundaries with downlink frame transmissions of the higher tier. The adjustment of the uplink OFDMA frame boundaries 414 may help ensure that the uplink transmissions of a higher-tier mobile station 104 are received within a cyclic prefix at the lower-tier base station 112 to reduce asynchronous interference at the lower-tier base station 112. The adjustment of the downlink OFDMA frame boundaries may help ensure that the downlink transmissions of the lower-tier base station 112 to the lower-tier mobile station 114 are received within a cyclic prefix at the higher-tier mobile station 104 to reduce asynchronous interference at the higher-tier mobile station 104.

In these embodiments, the alignment of the uplink OFDMA frame boundaries at the lower-tier base station 112 with respect to an uplink frame boundary of the higher-tier may reduce asynchronous interference at the lower-tier base station 112 by helping to ensure that the uplink transmissions of higher-tier mobile station 104 are received within the cyclic prefix at the lower-tier base station 112. Thus, interference caused by the uplink transmissions of the higher-tier mobile station 104 is synchronously received (i.e., the cyclic prefixes of the received symbols) at the lower-tier base station 112 and may be reduced by one or more synchronous interference mitigation techniques.

The alignment of the downlink OFDMA frame boundaries at the lower-tier base station 112 with respect to a downlink frame boundary of the higher-tier helps reduce asynchronous interference at the higher-tier mobile station 104 by helping to ensure that the downlink transmissions of the lower-tier base station 112 are received within a cyclic prefix at the higher-tier mobile station 104. Thus, interference caused by the downlink transmissions of the lower-tier base station 112 is synchronously received (e.g., within the cyclic prefixes of the received symbols) at the higher-tier mobile station 104 and may be reduced by one or more synchronous interference mitigation techniques.

Thus asynchronous interference at both the lower-tier base station 112 and the higher-tier mobile station 104 may be reduced allowing both the lower-tier base station 112 and the higher-tier mobile station 104 to further reduce the effects of interference by performing one or more synchronous interference mitigation techniques.

The alignment of frame boundaries may also reduce asynchronous interference by causing frames communicated by the lower-tier of the network to arrive within a cyclic prefix at a higher-tier base station 102. Lower-tier mobile station 114 may initially set their frame boundaries based on the frame boundaries of the lower-tier base station 112 and may further adjust their frame boundaries as discussed in more detail below.

In some embodiments, the lower-tier base station 112 may determine the initial unadjusted downlink frame boundary 412 by performing an over-the-air (OTA) synchronization process with the higher-tier base station 102. Due to the OTA synchronization process, the initial downlink frame boundary 412 may be delayed by approximately one-half the RTD time 415 with respect to the frame boundary 402 of the higher-tier base station 102. The lower-tier base station 112 may advance its uplink OFDMA frame boundary 414 with respect to the initial downlink frame boundary 412 by an amount approximately equal to the RTD time 415. The RTD time 415 may refer to twice the time it takes a signal to propagate between the higher-tier base station 102 and the lower-tier base station 112 over distance D1.

The OTA synchronization process may be performed based on the reception of preambles transmitted by the higher-tier base station 102. The OTA synchronization process may also include performing initial ranging to determine the signal propagation delay and thus the RTD 415.

As illustrated in FIG. 4, the initial unadjusted downlink frame boundary 412 may be delayed with respect to the frame boundary 402 of the high-tier base station 102 due to the signal propagation time over distance D1 between the higher-tier base station 102 and the lower-tier base station 112. In these embodiments, the lower-tier base station 112 may advance its uplink OFDMA frame boundaries 414 with respect to the initial downlink frame boundary 412 by approximately the RTD time 415. In these embodiments in which OTA synchronization is performed, by advancing its uplink OFDMA frame boundaries 414 from the initial downlink frame boundary 412 by approximately the RTD time 415, asynchronous interference may be reduced because an uplink transmission from the higher-tier mobile station 104 to the higher-tier base station 102 may arrive at the lower-tier base station 112 within the cyclic prefix of the frame boundary 414 of the lower-tier base station 112. For example, an uplink frame transmitted from the higher-tier mobile station 104 may arrive within the cyclic prefix of an uplink frame of the lower-tier-tier base station 112.

When OTA synchronization is performed by the lower-tier base station 112, the lower-tier base station 112 may align its downlink OFDMA frame boundary substantially with the initial downlink frame boundary 412. The downlink OFDMA frame boundary of the lower-tier base station 112 may not need to be delayed with respect to initial downlink frame boundary 412 since the frame boundary 402 of the higher-tier base station 102 received at the lower-tier base station 112 is already delayed by one-half the RTD 414.

When OTA synchronization is performed, the lower-tier mobile station 114 associated with the lower-tier base station 112 may communicate with an uplink frame boundary 416 advanced by the RTD time 415 between the lower-tier base station 112 and the higher-tier base station 102. The lower-tier mobile station 114 may further advance its uplink frame boundary 416 based on a round-trip-delay time between the lower-tier base station 112 and the lower-tier mobile station 114. In these embodiments, the lower-tier base station 112 may provide offset information to the lower-tier mobile station 114 associated with the lower-tier base station 112 during ranging so that the uplink frame boundaries 416 of the lower-tier mobile station 114 are at least advanced by the RTD time 415 between the lower-tier base station and the higher-tier base station. In this way, a lower-tier mobile station 114 may be unaware that it is operating in a multi-tier network. During the ranging process, the lower-tier mobile station 114 may determine the RTD time to the lower-tier base station 112 for further advancing is uplink frame boundaries 416 as illustrated in FIG. 4. Other techniques for conveying the offset information to a lower-tier mobile station 114 may also be used. For example, the offset information may be broadcasted by the lower-tier base station 112, provided to the lower-tier mobile station 114 via higher-layer signaling, or provided over a backhaul communication path.

In some non-OTA embodiments, the lower-tier base station 112 may determine an initial unadjusted downlink frame boundary based on timing information received from another source, such as over a backhaul network or from GPS satellites. In this case, the initial downlink frame boundary of the lower-tier base station 112 may be approximately aligned with the frame boundary 402 of the higher-tier base station 102. In these non-OTA embodiments, the lower-tier base station 112 may delay its downlink OFDMA frame boundary with respect to the initial downlink frame boundary by an amount approximately equal to a signal propagation time (i.e., one-half the RTD time 415). The lower-tier base station 112 may advance its uplink OFDMA frame boundary 414 with respect to the initial downlink frame boundary by an amount approximately equal to the signal propagation time (i.e., one-half the RTD time 415).

In these non-OTA embodiments, the lower-tier base station 112 may be configured to perform a ranging process with the higher-tier base station 102 to determine a signal propagation time between the higher-tier base station 102 and the lower-tier base station 112. Similar to the OTA synchronization embodiments discussed above, in these non-OTA synchronization embodiments, a lower-tier base station 112 may provide offset information to its associated lower-tier mobile station 114 during ranging so that the uplink frame boundaries of the lower-tier mobile station 114 can be aligned with the uplink frame boundaries of the lower-tier base station 112 and further advanced based on a RTD time between the lower-tier base station 112 and the lower-tier mobile station 114. In these non-OTA embodiments, since the lower-tier base station 112 determines the initial frame boundary based on a global reference (i.e., without the use of signal transmissions from the higher-tier base station 102), the initial frame boundary 412 may be substantially aligned with the frame boundary 402 of the higher-tier base station 102.

In addition to reducing asynchronous interference, a lower-tier base station 112 may perform one or more synchronous interference mitigation techniques to reduce the effects of synchronous interference resulting from transmissions of the higher tier being received within the cyclic prefix. In this way, strong interference (i.e., from transmissions by either the higher-tier base station 102 and/or a higher-tier mobile station 104) that are received within a cyclic prefix can be treated as synchronous interference allowing synchronous interference mitigation techniques to be performed. This may enhance system capability of the multi-tier OFDMA overlay network 100 and may help avoid the complexity and poor efficiency associated with interference management techniques for asynchronous interference.

Synchronous interference may comprise interference that is caused by the framed transmissions that fall within the cyclic prefix. For example, synchronous interference may comprise interference that is caused by the framed transmissions between the higher-tier base station 102 and one or more higher-tier mobile station 104 that fall within the cyclic prefix of frames received at the lower-tier base station 112. Synchronous interference includes transmissions within a non-orthogonal (i.e., the same) frequency spectrum that arrive within the cyclic prefix of a symbol. In these embodiments, synchronous interference may result because both the higher-tier mobile station 104 and the lower-tier mobile station 114 may transmit different information within the same frame time period using the same frequency spectrum. Examples of synchronous interference mitigation techniques include various signal processing techniques, the use of smart antennas techniques for nulling and avoiding interference, the use of smart antennas at the receiver to cancel interference, as well radio resource management schemes that use orthogonal sets of resources between the different tiers. A vast number of interference management schemes may be used with the embodiments described herein.

In some embodiments, the radius (r1) of the higher-tier service area 103 (i.e., a footprint) may be at least ten times (10×) a radius (r2) of the lower-tier service area 113. Transmissions by the lower-tier base station 112 and the lower-tier mobile station 114 may be at a significantly lower power level (e.g., 10×lower) than respective transmissions by the higher-tier base station 102 and the higher-tier mobile station 104. The radius of the higher-tier service area 103 may range from 1000 meters to more than 3000 meters, however this is not a requirement as the radius of the higher-tier service area 103 may be as small as 500 meters. The radius of the lower-tier service area 113 may range from less than 50 meters to up to few hundred meters.

In some IEEE 802.16 embodiments in which the cyclic prefix is ⅛ of a symbol, when the radius of the higher-tier service area 103 is about 1.5 km, a lower-tier base station 112 and a lower-tier mobile station 114 near the outer edges may benefit by adjusting their OFDMA frame boundaries as described herein. A lower-tier base station 112 and a lower-tier mobile station 114 operating in the central portion of the higher-tier service area 103, on the other hand, may not experience significant asynchronous interference from the higher tier and may not need to adjust their OFDMA frame boundaries as described herein.

In one example which utilizes the parameters of FIG. 3A and a cyclic prefix length of ⅛, when the radius of the higher-tier service area 103 is about 2 km, a lower-tier base station 112 and a lower-tier mobile station 114 operating in about half of the higher-tier service area 103 would experience asynchronous interference and may benefit by adjusting their OFDMA frame boundaries as described herein. In some embodiments, a lower-tier base station 112 may determine whether to adjust its OFDMA frame boundaries as described herein based on whether or not asynchronous interference would result due to timing misalignment exceeding the cyclic prefix. In these embodiments, a lower-tier base station 112 may determine whether to adjust its OFDMA frame boundaries based on the length of the cyclic prefix and the distance to the higher-tier base station. In some other embodiments, a lower-tier base station 112 may adjust its OFDMA frame boundaries as described herein regardless of whether asynchronous interference would result.

In some embodiments, for a predetermined cyclic prefix size (e.g., of ⅛ symbol), a lower-tier base station 112 is configured to adjust its OFDMA frame boundaries as described herein when the radius of the higher-tier service area 103 exceed a predetermined value (e.g., 500 meters). The lower-tier base station 112 may refrain from adjusting its OFDMA frame boundaries when the radius of the higher-tier service area 103 does not exceed a predetermined value.

In accordance with some embodiments, for a predetermined cyclic prefix length, a lower-tier base station 112 may adjust its OFDMA frame boundaries when the radius of a higher-tier service area 103 exceeds a predetermined value and may refrain from adjusting its OFDMA frame boundaries when the radius of the higher-tier service area 103 does not exceed a predetermined value. In some other embodiments, the lower-tier base station 112 may adjust its OFDMA frame boundaries when asynchronous interference would result based on a distance to the higher-tier base station 102 and a length of the cyclic prefix.

In some embodiments, the lower-tier base station 112 as well as the higher-tier base station 102 may operate in accordance with an IEEE 802.16 standard, such as the advanced air interface protocol defined in an IEEE 802.16(m), entitled "Part 16: Air Interface for Fixed and Mobile Broadband Wireless Access Systems". The higher-tier base station 102 may be an advanced base station (ABS) and the higher-tier mobile station 104 may be an advanced mobile station (AMS) that operate in accordance with the advanced air interface protocol defined in an IEEE 802.16(m). The lower-tier base station 112 may be a femto ABS with substantially lower transmit power than the higher-tier base station 102. The lower-tier base station 112 may be installed within a home, an office or other location to provide access to a local group of users with a femto service area. The lower-tier base station 112 may operate as a base station for the local group of users and may be connected to a service provider through a broadband connection. In some other embodiments, the elements of network 100 may be configured in accordance with one of the 3GPP-LTE standards, such as the LTE advanced.

In some embodiments, a lower-tier base station 112 may communicate OFDMA frames with lower-tier mobile stations in accordance with an OFDMA time-division duplexed (TDD) communication technique comprising downlink subframes and uplink subframes that are communicated in TDD manner. In these embodiments, network 100 may be configured in accordance with a TDD mode of WiMAX or 3GPP-LTE. In 3GPP-LTE, uplink subframes may comprise single carrier SC communication signals instead of multicarrier OFDM signals.

In some other embodiments, the lower-tier base station 112 may communicate OFDMA frames with lower-tier mobile stations in accordance with an OFDMA frequency-division duplexed (FDD) communication technique comprising downlink frames and uplink frames that are communicated in a FDD manner. In these embodiments, network 100 may be configured in accordance with a FDD mode of WiMAX or 3GPP-LTE. In these embodiments, the uplink and downlink frames may be communicated simultaneously.

Figure 5:
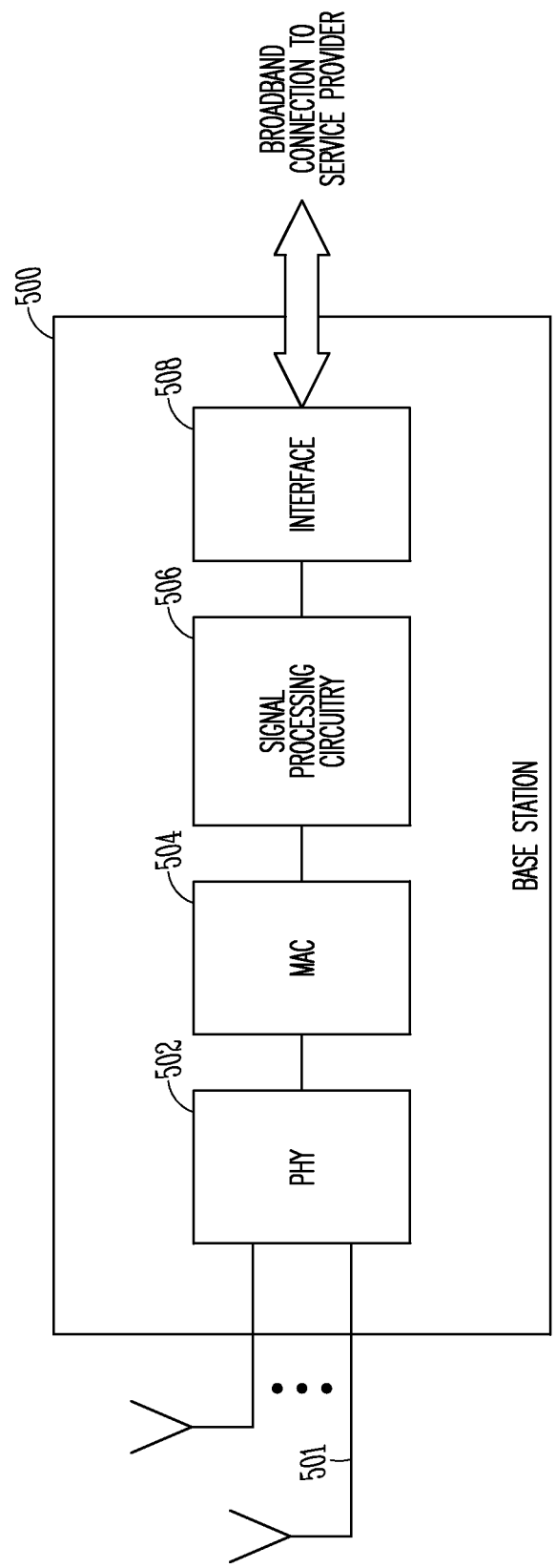
FIG. 5 is a block diagram of a base station in accordance with some embodiments.

FIG. 5 is a block diagram of a base station in accordance with some embodiments. Base station 500 may be suitable for use as lower-tier base station 112 (FIG. 1). Base station 500 may include physical (PHY) layer circuitry 502 for communicating with one or more mobile stations, such as lower-tier mobile station 114 (FIG. 1), utilizing one or more antennas 501. Base station 500 may also include media-access control (MAC) layer circuitry 504 for performing MAC layer operations, and signal processing circuitry 506 for performing operations described herein. Base station 500 may also include interface circuitry 508 to interface with a broadband connection to a service provider to allow base station to independently provide service to mobile stations within its service area.

In accordance with embodiments, signal processing circuitry 506 may cause MAC layer circuitry 504 to adjust OFDMA frame boundaries as discussed herein for transmission and receptions of frames by the PHY layer circuitry 502. Signal processing circuitry 506 may be configured to process signals, including signals received from a higher-tier base station and to determine the amount to adjust OFDMA frame boundaries as described herein. In OTA embodiments, processing circuitry 506 may be configured to process signals received from a higher-tier base station to determine an initial frame boundary. In some non-OTA embodiments, signals may be received over the broadband connection for determining the initial unadjusted downlink frame boundary. In some non-OTA embodiments, base station 500 may include a GPS receiver to receive GPS signals for determining the initial unadjusted downlink frame boundary.

In some IEEE 802.16(m) embodiments, base station 500 may operate in accordance with the parameters illustrated in FIG. 3A, including an FFT size of 1024 and a cyclic prefix of ⅛.

Antenna 501 may comprise one or more directional or omnidirectional antennas, including, for example, dipole antennas, monopole antennas, patch antennas, loop antennas, microstrip antennas or other types of antennas suitable for transmission of RF signals. In some multiple-input, multiple-output (MIMO) embodiments, antennas 501 may be effectively separated to take advantage of spatial diversity and the different channel characteristics that may result between each of antennas 501 and one or more antennas of a mobile station.

Although base station 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the base station 500 may refer to one or more processes operating on one or more processing elements.

Figure 6:
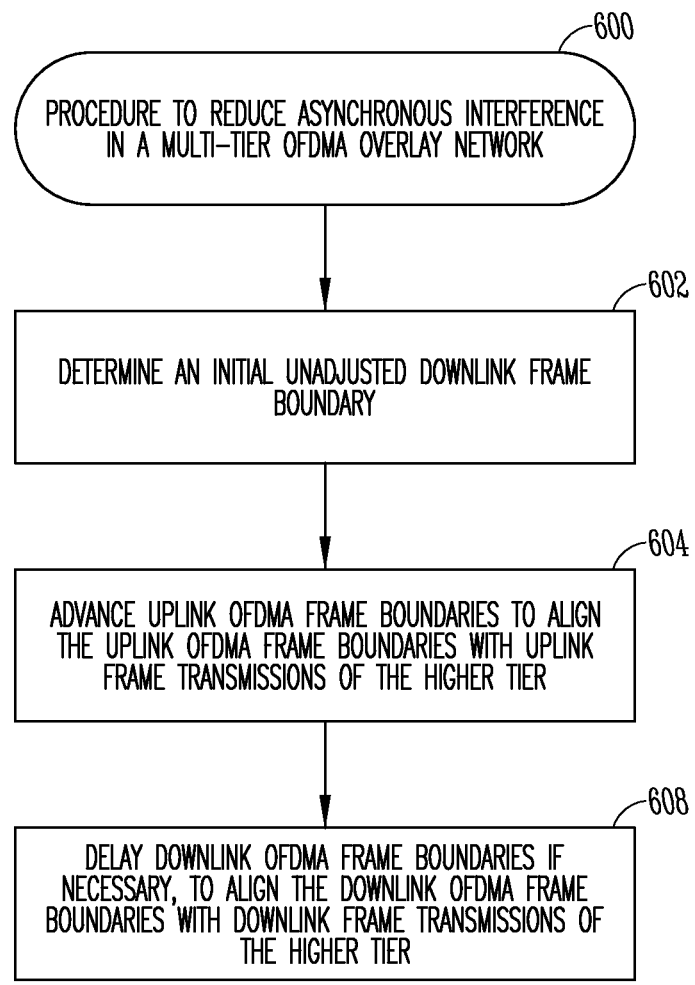
FIG. 6 illustrates a procedure to reduce asynchronous interference in a multi-tier OFDMA overlay network in accordance with some embodiments.

FIG. 6 illustrates a procedure to reduce asynchronous interference in a multi-tier OFDMA overlay network in accordance with some embodiments. Procedure 600 may be performed by a base station that is operating at a lower-tier in a multi-tier OFDMA overlay network, such as lower-tier base station 112 (FIG. 1).

In operation 602, the lower-tier base station determines an initial unadjusted downlink frame boundary. The initial unadjusted downlink frame boundary may be determined based on an OTA synchronization process or a non-OTA synchronization process described above.

In operation 604, uplink OFDMA frame boundaries 414 may be advanced to align the uplink OFDMA frame boundaries 414 with uplink frame transmissions of the higher tier.

In operation 608, downlink OFDMA frame boundaries may be delayed, if necessary, to align the downlink OFDMA frame boundaries with downlink frame transmissions of the higher tier.

In some embodiments, offset information may be provided to lower-tier mobile stations associated with the lower-tier base station during ranging to allow a lower-tier mobile station to advance an uplink frame boundary 416 (FIG. 4) by a round-trip delay time between the lower-tier base station and the higher-tier base station.

The adjustment of the uplink OFDMA frame boundaries in operation 604 may help ensure that the uplink transmissions of the higher-tier mobile station are received within a cyclic prefix at the lower-tier base station to reduce asynchronous interference at the lower-tier base station. The adjustment of the downlink OFDMA frame boundaries in operation 608 may help ensure that the downlink transmissions of the lower-tier base station to a lower-tier mobile station are received within a cyclic prefix at the higher-tier mobile station to reduce asynchronous interference at the higher-tier mobile station.

Although the individual operations of procedure 600 are illustrated and described as separate operations, one or more of the individual operations may be performed concurrently, and nothing requires that the operations be performed in the order illustrated. In some embodiments, the downlink frame boundaries may be adjusted followed the offset information being provided to a lower-tier mobile stations, and followed by adjustment of the uplink frame boundaries.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A lower-tier base station (LT-BS) to operate in a multi-tier OFDMA overlay network in which frames of a fixed length are communicated in accordance with either a frequency-division duplex (FDD) or time-division duplex (TDD) technique, wherein the LT-BS comprises physical layer circuitry and processing circuitry arranged to:
   communicate with a lower-tier mobile station (LT-MS) within a lower-tier service area that is located entirely within a higher-tier service area of a higher-tier base station (HT-BS);
   reduce asynchronous interference by adjusting OFDMA frame boundaries of frames communicated between the LT-MS and LT-BS without changing a frame length so that interference at the LT-BS caused by frames communicated between the HT-BS and a higher-tier mobile station (HT-MS) is synchronous rather than asynchronous; and
   perform a synchronous interference mitigation technique to reduce the effects of the synchronous interference, the synchronous interference resulting from the frames communicated between the HT-BS and the HT-MS arriving within a cyclic prefix of the frames communicated between the LT-BS and the LT-MS.

2. The lower-tier base station of claim 1 wherein the lower-tier base station is configured to advance uplink OFDMA frame boundaries to align the uplink OFDMA frame boundaries with uplink frame transmissions of the higher tier, and
   wherein the lower-tier base station is further configured to delay downlink OFDMA frame boundaries, if necessary, to align the downlink OFDMA frame boundaries with downlink frame transmissions of the higher tier.

3. The lower-tier base station of claim 2 wherein adjustment of the uplink OFDMA frame boundaries is to help ensure that the uplink transmissions of a higher-tier mobile station are received within a cyclic prefix at the lower-tier base station to reduce asynchronous interference at the lower-tier base station, and
   wherein adjustment of the downlink OFDMA frame boundaries is to help ensure that the downlink transmissions of the lower-tier base station to a lower-tier mobile station are received within a cyclic prefix at the higher-tier mobile station to reduce asynchronous interference at the higher-tier mobile station.

4. The lower-tier base station of claim 1 wherein the lower-tier base station is configured to determine an initial downlink frame boundary based on timing information received either over a backhaul network or from GPS satellites,
   wherein the initial downlink frame boundary of the lower-tier base station is approximately aligned with the frame boundary of the higher-tier base station,
   wherein the lower-tier base station is configured to delay the downlink OFDMA frame boundary with respect to the initial downlink frame boundary by an amount approximately equal to a signal propagation time, and
   wherein the lower-tier base station is configured to advance the uplink OFDMA frame boundary with respect to the initial downlink frame boundary by an amount approximately equal to the signal propagation time.

5. The lower-tier base station of claim 1
   wherein asynchronous interference results from the frames communicated between the HT-BS and the HT-MS not arriving within the cyclic prefix of the frames communicated between the LT-BS and the LT-MS, and
   wherein the lower-tier and higher-tier communicate using a same frequency spectrum.

6. The lower-tier base station of claim 5 wherein a radius of the higher-tier service area is at least ten times a radius of the lower-tier service area, and
   wherein transmissions by the lower-tier base station and the lower-tier mobile stations are at a significantly lower power level than respective transmissions by the higher-tier base station and the higher-tier mobile stations.

7. The lower-tier base station of claim 1 wherein for a predetermined cyclic prefix length, the lower-tier base station is configured to adjust its OFDMA frame boundaries when a radius of a higher-tier service area exceeds a predetermined value and is configured to refrain from adjusting its OFDMA frame boundaries when the radius of the higher-tier service area does not exceed a predetermined value.

8. The lower-tier base station of claim 1 wherein the lower-tier base station is configured to adjust its OFDMA frame boundaries when asynchronous interference would result based on a distance to a higher-tier base station and a length of a cyclic prefix.

9. The lower-tier base station of claim 1 wherein the lower-tier base station is configured to operate in accordance with an IEEE 802.16 standard or a 3GPP LTE standard.

10. A lower-tier base station to operate in a multi-tier OFDMA overlay network, the lower-tier base station comprising physical layer circuitry and processing circuitry arranged to:
   adjust OFDMA frame boundaries to cause frames communicated by a higher-tier to arrive within a cyclic prefix at the lower-tier base station and cause frames communicated by a lower-tier of the network to arrive within a cyclic prefix at a higher-tier mobile station,
   advance uplink OFDMA frame boundaries to align the uplink OFDMA frame boundaries with uplink frame transmissions of the higher tier,
   delay downlink OFDMA frame boundaries, if necessary, to align the downlink OFDMA frame boundaries with downlink frame transmissions of the higher tier,
   wherein the physical layer circuitry and the processing circuitry are arranged to adjust the uplink OFDMA frame boundaries so that the uplink transmissions of a higher-tier mobile station are received within a cyclic prefix at the lower-tier base station to reduce asynchronous interference at the lower-tier base station,
   wherein the physical layer circuitry and the processing circuitry are arranged to adjust the downlink OFDMA frame boundaries so that the downlink transmissions of the lower-tier base station to a lower-tier mobile station are received within a cyclic prefix at the higher-tier mobile station to reduce asynchronous interference at the higher-tier mobile station, wherein the physical layer circuitry and the processing circuitry are further arranged to determine an initial downlink frame boundary by performing an over-the-air (OTA) synchronization process with the higher-tier base station, wherein the initial downlink frame boundary is delayed by approximately one-half a round-trip-delay (RTD) time with respect to the frame boundary of the higher-tier base station, and wherein the physical layer circuitry and the processing circuitry are further arranged to advance the uplink OFDMA frame boundary with respect to the initial downlink frame boundary by an amount approximately equal to the RTD time.

11. The lower-tier base station of claim 10 wherein when OTA synchronization is performed by the lower-tier base station, the lower-tier base station is configured to align the downlink OFDMA frame boundary with the initial downlink frame boundary.

12. The lower-tier base station of claim 11 wherein when OTA synchronization is performed, the lower-tier mobile station associated with the lower-tier base station are configured to communicate with an uplink frame boundary advanced by the RTD time between the lower-tier base station and the higher-tier base station, and wherein the lower-tier mobile station is configured to further advance its uplink frame boundary based on a round-trip-delay time between the lower-tier base station and the lower-tier mobile station.

13. A lower-tier base station to operate in a multi-tier OFDMA overlay network in which frames of a fixed length are communicated in accordance with either a frequency-division duplex (FDD) or time-division duplex (TDD) technique, the lower-tier base station comprising physical layer circuitry and processing circuitry arranged to:

adjust OFDMA frame boundaries without changing a frame length to cause frames communicated by a higher-tier to arrive within a cyclic prefix at the lower-tier base station and cause frames communicated by a lower-tier of the network to arrive within a cyclic prefix at a higher-tier mobile station, wherein the physical layer circuitry and the processing circuitry are arranged to adjust the uplink OFDMA frame boundaries so that the uplink transmissions of a higher-tier mobile station are received within a cyclic prefix at the lower-tier base station to reduce asynchronous interference at the lower-tier base station, wherein the physical layer circuitry and the processing circuitry are arranged to adjust the downlink OFDMA frame boundaries so that the downlink transmissions of the lower-tier base station to a lower-tier mobile station are received within a cyclic prefix at the higher-tier mobile station to reduce asynchronous interference at the higher-tier mobile station, and wherein in addition to reducing asynchronous interference at the lower-tier base station, the physical layer circuitry and the processing circuitry are arranged to perform one or more synchronous interference mitigation techniques to reduce the effects of synchronous interference resulting from transmissions of the higher tier being received within the cyclic prefix.

14. A method performed by a lower-tier base station (LT-BS) to reduce asynchronous interference in a multi-tier OFDMA overlay network in which frames of a fixed length are communicated in accordance with either a frequency-division duplex (FDD) or time-division duplex (TDD) technique, the method comprising:

communicating with a lower-tier mobile station (LT-MS) within a lower-tier service area that is located entirely within a higher-tier service area of a higher-tier base station (HT-BS);

reducing asynchronous interference by adjusting OFDMA frame boundaries of frames communicated between the LT-MS and LT-BS without changing a frame length so that interference at the LT-BS caused by frames communicated between the HT-BS and a higher-tier mobile station (HT-MS) is synchronous rather than asynchronous; and performing a synchronous interference mitigation technique to reduce the effects of the synchronous interference, the synchronous interference resulting from the frames communicated between the HT-BS and the HT-MS arriving within a cyclic prefix of the frames communicated between the LT-BS and the LT-MS, wherein the LT-BS is configured to determine an initial downlink frame boundary based on timing information received either over a backhaul network or from GPS satellites.

15. The method of claim 14 wherein adjusting comprises:
advancing uplink OFDMA frame boundaries to align the uplink OFDMA frame boundaries with uplink frame transmissions of the higher tier, and delaying downlink OFDMA frame boundaries, if necessary, to align the downlink OFDMA frame boundaries with downlink frame transmissions of the higher tier.

16. The method of claim 14 wherein adjusting the uplink OFDMA frame boundaries is to help ensure that the uplink transmissions of a higher-tier mobile station are received within a cyclic prefix at the tower-tier base station to reduce asynchronous interference at the tower-tier base station, and wherein adjusting the downlink OFDMA frame boundaries is to help ensure that the downlink transmissions of the tower-tier base station to a lower-tier mobile station are received within a cyclic prefix at the higher-tier mobile station to reduce asynchronous interference at the higher-tier mobile station.

17. A method performed by a lower-tier base station to reduce asynchronous interference in a multi-tier OFDMA overlay network, the method comprising:

adjusting OFDMA frame boundaries to cause frames communicated by a higher-tier to arrive within a cyclic prefix at the tower-tier base station and to cause frames communicated by a lower-tier of the network to arrive within a cyclic prefix at a higher-tier mobile station, wherein adjusting the uplink OFDMA frame boundaries is to help ensure that the uplink transmissions of a higher-tier mobile station are received within a cyclic prefix at the tower-tier base station to reduce asynchronous interference at the lower-tier base station, and wherein adjusting the downlink OFDMA frame boundaries is to help ensure that the downlink transmissions of the lower-tier base station to a lower-tier mobile station are received within a cyclic prefix at the higher-tier mobile station to reduce asynchronous interference at the higher-tier mobile station, and wherein the method further comprises: providing offset information to the lower-tier mobile station associated with the tower-tier base station during ranging to allow the lower-tier mobile station to advance an uplink frame boundary of the lower-tier mobile station by a round-trip delay time between the lower-tier base station and the higher-tier base station, wherein the lower-tier mobile station is configured to further advance its uplink frame boundary based on a round-trip-delay time between the lower-tier base station and the tower-tier mobile station.

18. A multi-tier OFDMA overlay network comprising a higher tier and a lower tier in which frames of a fixed length are communicated in accordance with either a. frequency-division duplex (FDD) or time-division duplex (TDD) technique, the higher tier including a higher-tier base station (HT-BS) and a higher-tier mobile station (HT-MS) associated with the HT-BS, the lower tier including a lower-tier base station (LT-BS) and a lower-tier mobile station (LT-MS) associated with the lower-tier base station, wherein the LT-BS is configured to:

communicate with the LT-MS within a lower-tier service area that is located entirely within a higher-tier service area of the HT-BS;

reduce asynchronous interference by adjusting OFDMA frame boundaries of frames communicated between the LT-MS and LT-BS without changing a frame length so that interference at the LT-BS caused by frames communicated between the HT-BS and the HT-MS is synchronous rather than asynchronous; and perform a synchronous interference mitigation technique to reduce the effects of the synchronous interference, the synchronous interference resulting from the frames communicated between the HT-BS and the HT-MS arriving within a cyclic prefix of the frames communicated between the LT-BS and the LT-MS.

19. The multi-tier OFDMA overlay network of claim 18 wherein the lower-tier base station is further configured to delay its downlink OFDMA frame boundaries, if necessary, to align the downlink OFDMA frame boundaries with downlink frame transmissions of the higher tier to help ensure that the downlink transmissions of the lower-tier base station to a lower-tier mobile station are received within a cyclic prefix at the higher-tier mobile station to reduce asynchronous interference at the higher-tier mobile station.

20. The multi-tier OFDMA overlay network of claim 19 wherein the lower-tier base station and the higher-tier base station communicate in accordance with an OFDMA communication technique using a non-orthogonal frequency spectrum.

21. The multi-tier OFDMA overlay network of claim 20 wherein. the OFDMA communication technique is in accordance with either an IEEE 802.16 or a 3GPP LTE communication standard.

* * * * *

UNITED STATES PATENT AND TRADEMARK OFFICE
CERTIFICATE OF CORRECTION

PATENT NO. : 8,630,229 B2
APPLICATION NO. : 12/822925
DATED : January 14, 2014
INVENTOR(S) : Himayat et al.

It is certified that error appears in the above-identified patent and that said Letters Patent is hereby corrected as shown below:

On title page 2, in column 1, under "Other Publications", line 1, delete "N," and insert --N.,--, therefor On title page 2, in column 1, under "Other Publications", line 2, delete "2009.," and insert --2009,--, therefor In the Claims:

In column 11, line 59, in claim 3, delete "arc" and insert --are--, therefor

In column 12, line 21, in claim 5, after "and", insert --the--, therefor

In column 12, line 56, in claim 10, after "tier,", insert --and--, therefor

In column 14, line 38, in claim 16, delete "tower" and insert --lower--, therefor In column 14, line 39, in claim 16, delete "tower" and insert --lower--, therefor In column 14, line 42, in claim 16, delete "tower" and insert --lower--, therefor In column 14, line 51, in claim 17, delete "tower" and insert --lower--, therefor In column 14, line 57, in claim 17, delete "tower" and insert --lower--, therefor In column 14, line 67, in claim 17, delete "tower" and insert --lower--, therefor In column 15, line 4, in claim 17, after "station,", insert --and--, therefor In column 15, line 8, in claim 17, delete "tower" and insert --lower--, therefor In column 15, line 10, in claim 18, after "a", delete ".", therefor In column 16, line 22, in claim 21, after "wherein", delete ".", therefor Signed and Sealed this
First Day of July, 2014

Michelle K. Lee
*Deputy Director of the United States Patent and Trademark Office*